Feb. 16, 1954
P. J. KAIRIS
2,669,086
SELF-CLEANING RAKE
Filed Sept. 12, 1950
2 Sheets-Sheet 1
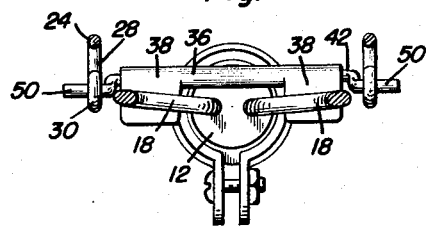
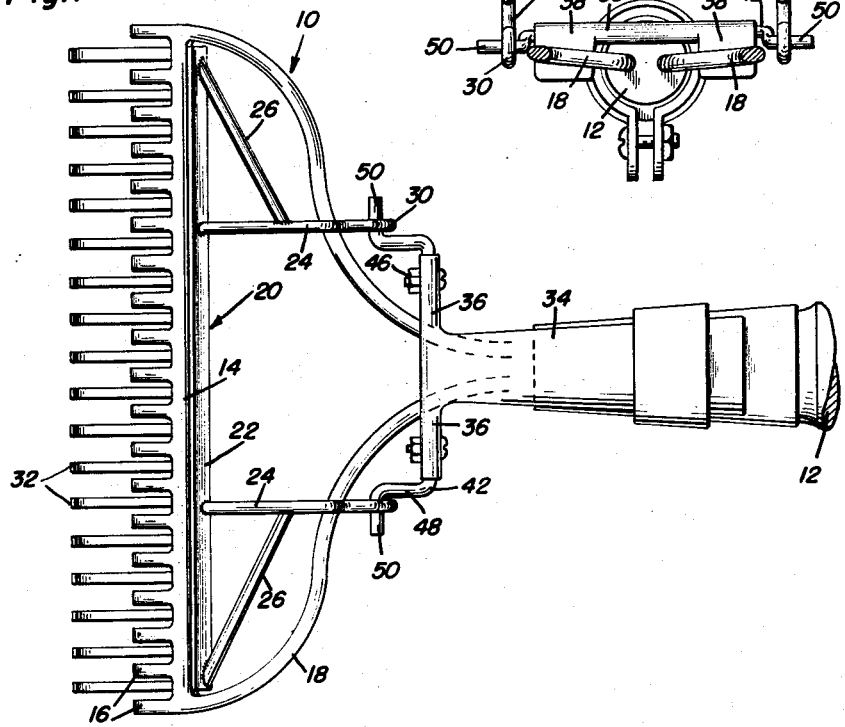
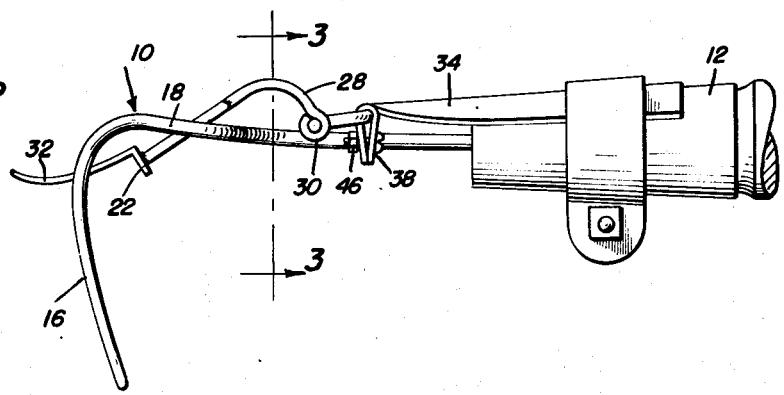
Peter J. Kairis
INVENTOR.

Feb. 16, 1954 P. J. KAIRIS 2,669,086
SELF-CLEANING RAKE
Filed Sept. 12, 1950 2 Sheets-Sheet 2
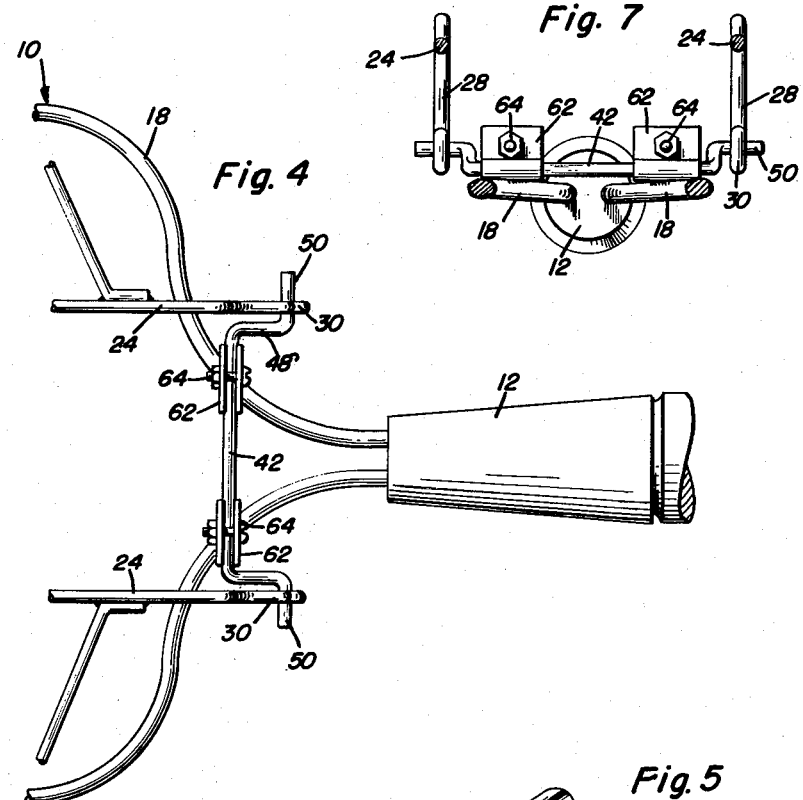
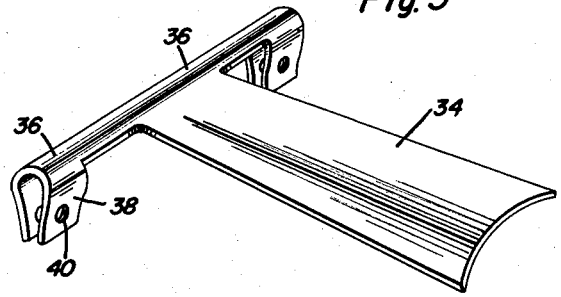
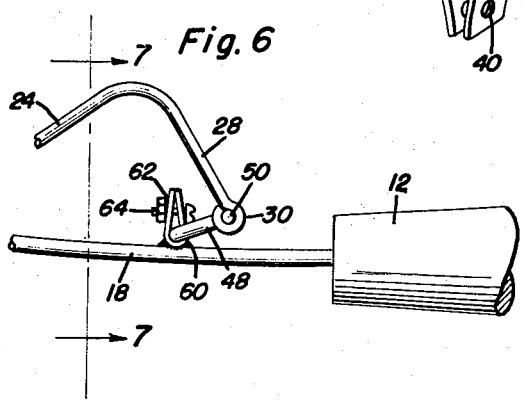
Peter J. Kairis
INVENTOR.

Patented Feb. 16, 1954

2,669,086

UNITED STATES PATENT OFFICE 2,669,086

SELF-CLEANING RAKE

Peter J. Kairis, Minocqua, Wis.

Application September 12, 1950, Serial No. 184,472

1 Claim. (Cl. 56—400.08)

This invention comprises novel and useful improvements in a self-cleaning rake, and more specifically pertains to an attachment which is applicable to conventional forms of rakes for stripping leaves and other material from the teeth of the rake during normal operation of the rake.

The primary object of this invention is to provide an improved rake which shall be automatically self-cleaning during its operation.

A further object of the invention is to provide an attachment which may be readily applied to conventional forms of rakes to cause the same to automatically clean the teeth during operation thereof.

A further object of the invention is to provide a self-cleaning device for rakes which may be readily applied to conventional forms of rakes, will not interfere with the normal use of the rake, and yet shall be automatically operative during operation of the rake for stripping leaves and the like from the teeth of the rake.

A still further object of the invention is to provide a rake cleansing device as set forth in the foregoing objects in which the amplitude of movement of the device, together with its range of movement, may be readily adjusted.

And a final important object of the invention is to provide a self-cleaning attachment for rakes as set forth in the foregoing objects which will in no way interfere with the normal raking operation of the implement while affording an automatic self-cleansing operation upon the rake teeth at the completion of each raking stroke of the implement.

These, together with various ancillary features and objects of the invention, which will later become apparent as the following description proceeds, are attained by the present invention, preferred embodiments of which have been illustrated, by way of example only, in the accompanying drawings, wherein:

Figure 1 is a top plan view of a portion of a conventional form of rake showing a preferred embodiment of the self-cleansing attachment applied thereto;

Figure 2 is a side elevational view of the arrangement of Figure 1;

Figure 3 is a vertical transverse sectional view taken substantially upon the plane indicated by the section line 3—3 of Figure 2;

Figure 4 is a top plan view of a portion of a conventional form of rake showing a second form of self-cleaning attachment applied thereto, parts being broken away which are similar in construction to the corresponding part shown in Figure 1;

Figure 5 is a perspective view of a supporting bracket forming a part of the device of Figures 1–3;

Figure 6 is a view in side elevation of the form of the invention shown in Figure 4; and Figure 7 is a vertical transverse sectional view taken substantially upon the plane indicated by the section line 7—7 of Figure 6.

Referring now more specifically to the accompanying drawings, wherein like numerals designate similar parts throughout the various views, attention is directed first to the preferred embodiment of the invention illustrated in Figures 1–3 and 5 of the drawings. In this arrangement, there is disclosed a conventional form of rake head indicated generally by the numeral 10 to which is applied the usual rake handle 12, this rake having the customary transverse rake bar 14 with rake teeth 16 thereon, the transverse bar 14 being connected as by integral curved rod-like frame members 18 by means of which the rake head is secured to the handle 12.

As so far disclosed, and as will be readily apparent from Figures 1 and 2, the rake head with its teeth and handle is a conventional form of garden rake in common use. It is to this conventional form of garden rake that the attachment or improvement forming the subject of this invention is to be applied for converting this conventional rake to one which has an automatic self-cleaning operation.

The attachment itself consists of a stripper head indicated generally by the numeral 20 and which includes a transverse bar 22 together with parallel, rearwardly extending support arms 24 which are connected to the bar 22 intermediate its ends, as by diagonal or inclined brace rods 26, the support arms 24 at their outer ends being downwardly turned, as at 28, and having eye terminals 30 which constitute pivots or hinges by means of which the stripper head is mounted for a pendulum-like vertical swinging movement.

The transverse bar 22 of the stripper head is positioned normally between the rake teeth 16 and the handle 12 and has a vertical swinging or pendulum-like movement therebetween, this transverse bar having a plurality of forwardly and downwardly curving stripper teeth 32 which are slidably received and are interdigitated between the corresponding teeth 16 of the rake head.

It will be particularly noted that while the rake teeth 16 curve in a backward direction, that is, toward the handle 12, the stripper teeth 32 curve forwardly, that is, away from the handle and extend between the rake teeth during substantially the entire pendulum-like movement of the stripper head.

A mounting means is provided for securing the stripper head to the rake in a fixed but adjustable manner. This mounting means comprises a T-shaped sheet metal plate, as shown in Figure 5, the same including a stem portion 34 which is curved to conform to the exterior surface of the rake handle 12, and which is provided with oppositely extending cross-arms 36 which, at their outer ends, are provided with downturned lugs or tabs 38, apertured, as at 40.

An adjustable fulcrum member is detachably secured in the T-shaped mounting member. This fulcrum member comprises a crank shaft having an intermediate straight portion 42 which is adapted to be received between the pairs of depending lugs 38 and clamped therein, as by fastening bolts 46, through the apertures 40 of the lugs to clamp the crank shaft in the mounting bracket. At its extremities, the central portion has perpendicularly disposed arms 48 which, at their outer ends, are provided with outturned crank arms 50 upon which are pivotally journaled the eye portions 30 of the stripper head, whereby the latter is pivotally mounted upon the rake head and handle.

It is evident that by rotatably adjusting the crank member in its clamped seat in the support member that the angular position of the crank arms 48, 50 with respect to the rake head may be readily adjusted, thereby varying the path of travel of the pendulum-like swinging of the stripper head, as well as the amplitude of swinging movement.

The amplitude of swinging movement of the stripper head is preferably regulated or limited by the engagement of the stripper head with the rake head. Thus, it will be apparent that the support arms 24 overlie the rake head curved member 18 whereby downward swinging movement of the stripper head will be limited by engagement of the arms 24 upon the member 18, this limiting position preferably occurring when the stripper teeth are substantially at the bottom end of the rake teeth. The upward movement of the stripper head is limited by engagement of the stripper teeth 32 with the transverse bar 14 of the rake head; or, alternatively, by the engagement of the transverse bar 22 of the stripper head with the rake teeth 16. In any event, this range of movement can obviously be adjusted by the angular adjustment of the crank shaft in the support member.

In operation of the device as so far described, it will be seen that when the rake is pulled over the surface of the ground, the rearwardly curving stripper teeth 32 will not interfere with the travel of the rake but will pivot upwardly over the material being raked by the implement. However, at the end of the raking stroke, the weight and inertia of the stripper head will cause the same to pivot downwardly about the crank arms, this downward movement of the stripper teeth serving to remove grass or other obstructions from the rake teeth.

Disclosed in Figures 4, 6 and 7 is a modified construction for carrying out the same general principles of construction and operation for automatically cleaning the rake teeth. In this arrangement, however, the mounting or supporting means for the stripper head is secured directly to the rake head rather than to the rake handle. The same construction of crank shaft having a central portion 42, perpendicular portions 48 and crank arms 50, as previously described, is employed, these crank arms pivotally receiving the eye portions 30 of the support arms 24 of the stripper head assembly. However, in order to adjustably secure and mount this crank shaft upon the rake, a pair of mounting brackets are welded or otherwise secured, as at 60, see Figure 6, to the curved member 18 forming a part of the frame of the rake head. These brackets comprise U-shaped members 62 having an open upper end and which extend upwardly from the member 18, and thus serve to receive and support the crank member 42 therein. Fastening bolts 64 serve to clamp and secure the crank shaft in angularly adjusted position in the same manner as the adjustment of the crank shaft in the preceding embodiment. The operation of this form of the invention is identical to that previously described, except for the difference in construction of the mounting and adjusting support of the crank arms.

It will be readily appreciated that the present invention, by its automatic self-cleaning operation, enables the user to employ the rake for handling unsanitary materials without danger of contamination of the person or hands of the user, since it will not be necessary for the user to manually remove any material tending to clog the teeth of the rake.

It will be further seen that there has been provided an attachment which may be readily applied to conventional forms of rake and when so applied will complement the customary raking functions by an automatic self-cleaning operation.

Since, from the foregoing, the construction and advantages of this self-cleaning rake are readily apparent, further description is believed to be unnecessary.

In the embodiment of Figures 1, 2, 3 and 5, it will be appreciated that the T-shaped metal bracket will be secured in any suitable manner to the handle 12 as by an adjustable clamp embracing the stem 34 and the handle, as shown.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claim.

Having described the invention, what is claimed as new is:

A self-cleaning rake having a rake head with rake teeth thereon, a handle, and rod-like members connecting the rake head to the handle, a stripper head having stripper teeth thereon interdigitated with the rake teeth crosswise thereof, and pivoted means swingably mounting said stripper head on said handle for free gravitational stripping movement relative to said teeth, and including arms coacting with said members to limit gravitational swinging of said stripper head, a bracket fixed to said handle, cranks on which said arms are pivoted, and clamps on said bracket in which said cranks are rotatable into different set positions to adjust said arms for engagement with said members so as to vary the amplitude of gravitational swinging movement of said stripper head.

PETER J. KAIRIS.

References Cited in the file of this patent

UNITED STATES PATENTS

| Number | Name | Date |
|---|---|---|
| 1,096,342 | Alexander | May 12, 1914 |
| 1,138,530 | Berge | May 4, 1915 |
| 1,195,885 | Welsch | Aug. 22, 1916 |
| 1,442,615 | Humphrey | Jan. 16, 1923 |
| 1,449,673 | Hecht | Mar. 27, 1923 |
| 1,677,635 | Howe et al. | July 17, 1928 |
| 1,781,734 | Roth | Nov. 18, 1930 |
| 1,887,659 | Paxson | Nov. 15, 1932 |